J. HOLLINGSWORTH.
Wind-Engine.

No. 204,044. Patented May 21, 1878.

WITNESSES
Mary S. Utley.
F. J. Masi.

INVENTOR
Joseph Hollingsworth,
by E. W. Anderson.
ATTORNEY

UNITED STATES PATENT OFFICE.

JOSEPH HOLLINGSWORTH, OF JONESBOROUGH, INDIANA.

IMPROVEMENT IN WIND-ENGINES.

Specification forming part of Letters Patent No. 204,044, dated May 21, 1878; application filed March 23, 1878.

*To all whom it may concern:*

Be it known that I, JOSEPH HOLLINGSWORTH, of Jonesborough, in the county of Grant and State of Indiana, have invented a new and valuable Improvement in Windmills; and I do hereby declare that the following is a full, clear, and exact description of the construction and operation of the same, reference being had to the annexed drawings, making a part of this specification, and to the letters and figures of reference marked thereon.

Figure 1:
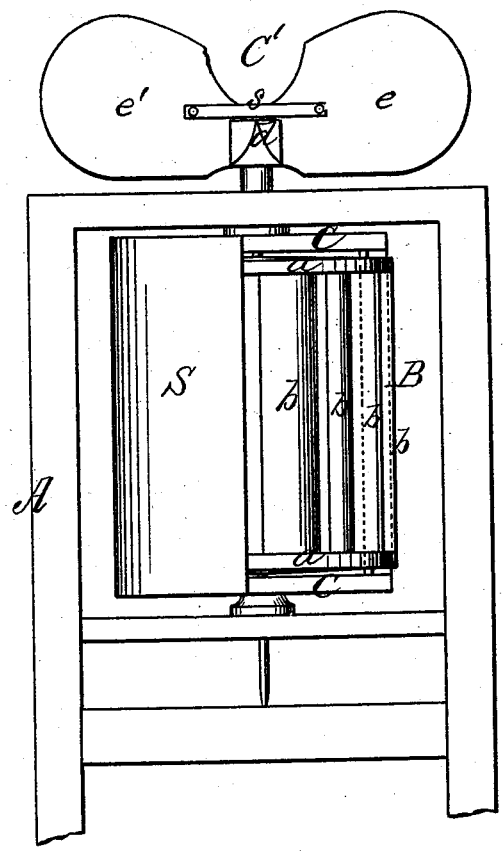
Figures 2, 3:
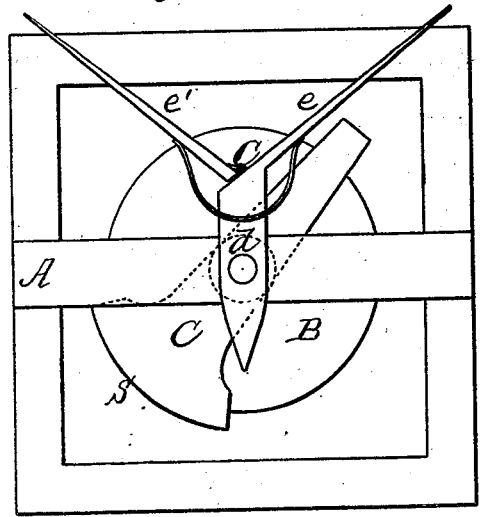

Figure 1 of the drawings is a representation of a side view of my invention. Fig. 2 is a top view thereof, and Fig. 3 is a horizontal section of the same.

This invention has relation to improvements in vertical wind-wheels; and the nature of the invention consists in combining, with a vertical wind-wheel, a shield and a governor, as will be hereinafter more fully explained.

In the annexed drawings, the letter A designates the tower of my improved wind-wheel, being preferably a four-sided open structure of suitable height. Within this tower or frame is mounted, in suitable bearings, a vertical wind-wheel, B. This wheel is composed of two circular heads, $a$, and of the curved blades $b$, arranged at a suitable distance apart. The blowing of the wind through this wheel causes it to rotate rapidly.

C represents a rectangular frame, rotating on the axis of the wheel independently thereof. At one end of this frame is a vertical shield, S, of curved form transversely and concentric with the convexity of the wheel.

C' represents a butterfly-vane, rigidly secured to the spindle of the shield-frame in a position oblique relative thereto. This vane is composed of a body, $d$, and two diverging wings, $e\ e'$, the first of which is rigidly secured to the body, and the latter hinged thereto in any suitable manner, so as to vibrate horizontally, the said arm $d$ serving as a stop for the wing $e'$. The wing $e'$ is held in the position shown in Fig. 2 by means of a curved spring, $s$, secured at one end to the said wing, $e'$, and at the other to the wing $e$; or the spring may be in between the movable wing and fixed wing.

Under ordinary winds the wing $e'$ is not affected, and the vane remains with its length in the direction of the current. Under these circumstances the shield is maintained so as to guard the left half of the perimeter of the wheel from the wind, the right half only being exposed thereto; but when the wind is dangerously high, the wing $e'$ is flexed inward upon the wing $e$, the latter swings into the wind, and the shield swung to the front, so as to exclude the wind more or less, according to its force, from the wheel.

By this means the speed with which the wheel revolves is automatically regulated, and all danger of wrecking the machinery effectually prevented.

As the wind decreases the wing $e'$ vibrates away from the wing $e$ in proportion, and the shield uncovers a greater part of the wheel.

What I claim as new, and desire to secure by Letters Patent, is—

The combination, with of the wheel B and its rotating shield S, of the vane C', having arm $d$, forming a stop for the vibrating hinged wing $e'$, the fixed wing $e$, and spring $s$, secured to the said wings, substantially as specified.

In testimony that I claim the above I have hereunto subscribed my name in the presence of two witnesses.

JOSEPH HOLLINGSWORTH.

Witnesses:
L. M. BARNARD,
H. L. DAILY.